(12) United States Patent
Lee et al.

(10) Patent No.: US 8,065,366 B2
(45) Date of Patent: Nov. 22, 2011

(54) SYSTEM AND METHOD FOR TRANSMITTING PERSONAL NETWORKING-BASED BLOG POST, AND SERVER APPLIED TO THE SAME

(75) Inventors: Chang-Su Lee, Seoul (KR); Dong-Chan Lim, Gyeonggi-Do (KR); Su-Kyung Kim, Seoul (KR); Sung Kim, Gyeonggi-Do (KR); Sil-Keun Hwang, Gyeongsangnam-Do (KR)

(73) Assignee: SK Telecom Co., Ltd. (KR)

( * ) Notice: Subject to any disclaimer, the term of this patent is extended or adjusted under 35 U.S.C. 154(b) by 0 days.

(21) Appl. No.: 12/676,620

(22) PCT Filed: Oct. 17, 2008

(86) PCT No.: PCT/KR2008/006165
§ 371 (c)(1),
(2), (4) Date: Mar. 5, 2010

(87) PCT Pub. No.: WO2009/057905
PCT Pub. Date: May 7, 2009

(65) Prior Publication Data
US 2010/0250675 A1 Sep. 30, 2010

(30) Foreign Application Priority Data
Oct. 30, 2007 (KR) .......................... 10-2007-0109855

(51) Int. Cl.
G06F 15/16 (2006.01)
(52) U.S. Cl. ....................................... 709/204; 709/207
(58) Field of Classification Search .......... 709/204–205, 709/217–219, 224, 225
See application file for complete search history.

(56) References Cited

U.S. PATENT DOCUMENTS 7,613,769 B1 * 11/2009 Hess .............................. 709/203
7,908,312 B2 * 3/2011 Kang et al. ..................... 709/201
(Continued)

FOREIGN PATENT DOCUMENTS

KR 10-2003-0094151 A 12/2003
(Continued)

*Primary Examiner* — Faruk Hamza
(74) *Attorney, Agent, or Firm* — Baker & Hostetler LLP

(57) ABSTRACT

Disclosed are a system and method for distributing a blog post based on personal networking, and a server to be applied thereto. The system includes a writer terminal unit, which makes a series of settings for forming a blog post containing contents posted by a writer through the writer's blog registered with an online community service, and then distributes the blog post to at least one or more acquaintances blogs registered to personal networking with the writer, sharer/distributor terminal units, which make setting for posting the blog post on the acquaintances blogs, or distributing the blog post to at least one or more other acquaintances blogs registered to personal networking with sharers/distributors, and a service management server, which differentially provides management authority for the blog post to each of the writer and the sharers/distributors, and integrally manages the blog post distributed to a plurality of blogs, based on a path along which the blog post is distributed. The system and method distributes a blog post containing a writer's specific purpose of posting, such as a help-wanted notice, step by step through blogs registered with an online community service, based on trust relationships, thereby providing a notice platform, which is so efficient that an advertiser who writes a blog post, such as a help-wanted notice, can quickly find a qualified person, based on his/her trust relationships.

21 Claims, 3 Drawing Sheets

U.S. PATENT DOCUMENTS

| | | | |
|---|---|---|---|
| 7,912,960 B2 * | 3/2011 | Bansod et al. | 709/227 |
| 7,933,958 B2 * | 4/2011 | Carr et al. | 709/206 |
| 2004/0260701 A1 * | 12/2004 | Lehikoinen et al. | 707/10 |
| 2005/0131750 A1 * | 6/2005 | Kogan et al. | 705/9 |
| 2006/0200483 A1 * | 9/2006 | Gorzela et al. | 707/102 |
| 2006/0218181 A1 * | 9/2006 | Jeon | 707/103 R |
| 2007/0220090 A1 * | 9/2007 | Hall | 709/204 |
| 2008/0183810 A1 * | 7/2008 | Ruedlinger | 709/203 |
| 2008/0294450 A1 * | 11/2008 | Kasahara et al. | 705/1 |
| 2008/0313260 A1 * | 12/2008 | Sweet et al. | 709/201 |
| 2009/0327432 A1 * | 12/2009 | Augustine et al. | 709/206 |

FOREIGN PATENT DOCUMENTS

| | | |
|---|---|---|
| KR | 10-2006-0085127 A | 7/2006 |
| KR | 10-2006-0102683 A | 9/2006 |
| KR | 10-0667819 B1 | 1/2007 |

* cited by examiner

SYSTEM AND METHOD FOR TRANSMITTING PERSONAL NETWORKING-BASED BLOG POST, AND SERVER APPLIED TO THE SAME

TECHNICAL FIELD

The present invention relates to technology for implementing a community service, and more particularly to a system and method for distributing a blog post based on personal networking, which distributes a blog post containing a writer's specific purpose of posting, such as a help-wanted notice, not unilaterally but step by step through blogs registered with an online community service, based on trust relationships, for example, online acquaintanceships, thereby utilizing the blog post as an efficient notice platform, and a server to be applied to the same.

BACKGROUND ART

People form acquaintanceships with each other through social activities in their daily life. The acquaintanceship refers to others who, as a result of sharing a certain degree of information, experience, a sense of belonging to a community, or the like, fall within a circle of trustworthy people. In general social life, people derive new acquaintanceships from established acquaintanceships, or form acquaintanceships through kinships or territorial relationships, or by being acquainted with each other while performing common businesses via specific groups, companies, or teams to which they belong.

In recent years, due to the development and popularization of networks, such as the Internet, acquaintanceships have been formed online, and services for providing a personal space, such as a blog and a mini homepage, have been proposed to allow people to actively form acquaintanceships online.

A system capable of forming communities for job-offering/job-hunting has been proposed on networks. In this system, basic information data necessary to form personal networking, such as companies, job series, and job groups input by members, are automatically sorted, and communities are formed according to the sorted companies, job series, and job groups. Such a system for forming personal networking in the form of a community corresponds to a system in which plurality of registered subscribers automatically constitute a community. On account of this, the system has a problem in that although constituent members belong to a common community, trust-worthiness between the constituent members cannot be guaranteed, and thus job-offering/job-hunting for community members is as good as job-offering/job-hunting for many and unspecified persons on the Internet.

Also, a personal networking management system has been proposed, which includes a data connection means for collecting personal information of subscribers on the Internet, an integrated database for storing personal information and various materials, a personal networking management means for linking the subscribers to personal networking on the Internet at the subscribers request, and databasing and managing the linked personal networking, and a browsing means for showing users processing statuses on the Internet. In this system, online personal networking is formed by a subscriber's sending an e-mail to his/her acquaintances and the acquaintances approval for the e-mail. There is also technology for accumulating, storing, and managing personal networking information, generated in the above manner, in an integrated database to provide service subscribers with real name-personal networking information, thereby allowing the subscribers to share trustworthy personal networking information.

This technology may ensure trustworthiness, but has a problem in that it is only possible to form a very limited circle of personal networking because online personal networking can be formed only for acquaintances who have gone through an approval procedure via an e-mail.

Further, there is an Internet club management service for providing a function of allowing club members belonging to an Internet club together to store and share personal information and various materials collected according to their respective personal networking.

This service may be expected to form a wide circle of personal networking by making personal networking information to share with club members, but has a problem in that there are limitations on the formation of trustworthy personal networking because a club is a group incapable of guaranteeing trustworthiness, and thus personal information leakage and others may happen.

A variety of community services for forming personal networking, as the above-mentioned prior arts, have been proposed, and the general trend is that respective Internet users join various community services according to their patterns of use. When an Internet user initially subscribes to a corresponding community service, it takes some time and effort to construct personal networking information for activating the subscribed service, which causes a problem in that it is impossible for the user to activate his/her service at the initial stage of the subscription to the service.

Therefore, there is a need for a way to complement the above problems.

DISCLOSURE OF INVENTION

Technical Problem

Accordingly, the present invention has been made to solve at least the above-mentioned problems occurring in the prior art, and an object of the present invention is to provide a system and method for distributing a blog post based on personal networking, which distributes a blog post containing a writer's specific purpose of posting, such as a help-wanted notice, not unilaterally but step by step through blogs registered with an online community service, based on trust relationships, for example, online acquaintanceships, thereby utilizing the blog post as an efficient notice platform, and a server to be applied to the same.

A further object of the present invention is to provide a system and method for distributing a blog post based on personal networking, which distributes a blog post step by step, based on trust relationships, and separately manages the distribution path of a blog post initially formed by a writer through a service providing system to provide the writer with a corresponding service, thereby making it possible for the writer to instantly confirm many people's reactions or responses to the corresponding blog post, and a server to be applied to the same.

Technical Solution

In order to accomplish the above objects, in accordance with an aspect of the present invention, there is provided a system for distributing a blog post based on personal networking in a blog service providing system, the system including a writer terminal unit for allowing a writer to select distributors from among acquaintances registered to personal networking with the writer, and distributing a specific post to blogs of the selected distributors; distributor terminal units for allowing the selected distributors to select redistributors from among acquaintances registered to personal networking with the distributors, and distributing the post to blogs of the selected redistributors; and a service management server for providing management authority for the post to each of the writer and the distributors, and controlling the post according to the provided management authority when the writer or the distributors control the post.

Preferably, the service management server sets an inbound link for the writer's blog as a first variable value, sets inbound links for the distributors blogs, to which the post is distributed, as second variable values when the post is distributed, and distributes the post only if inbound links for distributors blogs, to which the post is to be distributed, do not have the first variable value or the second variable values when the post is distributed, thereby preventing duplicate distribution of the post.

Also, it is preferred that the service management server controls the post not to be distributed any longer when a command for stopping distribution of the post is received through the writer terminal unit.

Preferably, the post includes contents posted by the writer, and replies and trackbacks corresponding to the contents.

Preferably, the management authority includes at least one of authority to modify the post, authority to delete the post, and authority to set the post to "Public/private"

Preferably, when either the writer terminal unit or the distributor terminal units control the post, the service management server permits the writer terminal unit's or the distributor terminal units' control corresponding to the provided management authority, and blocks the writer terminal unit's or the distributor terminal units' control not corresponding to the provided management authority.

Also, it is preferred that the service management server employs the same post ID for the post in all the blogs to which the post is distributed.

In accordance with another aspect of the present invention, there is provided a service management server for providing a blog service to an external terminal unit connected via a network, the service management server distributing a specific blog post to blogs of one or more distributors if a writer who writes the post in his/her blog selects the distributors from among acquaintances registered to personal networking with the writer, distributing the post to blogs of redistributors if the distributors select the redistributors from among acquaintances registered to personal networking with the distributors, providing management authority for the post to each of the writer and the distributors, and controlling the post according to the provided management authority when the writer or the distributors control the post.

Preferably, the service management server includes a member information storage unit for managing information on members subscribing to the blog service and information on acquaintances linked to the members; a blog management unit for managing a plurality of blogs including the writer's and the distributors blogs, and providing a menu for performing at least one of functions to form, modify, and delete the post in the blogs; a post distribution unit for distributing the post between the corresponding blogs in correspondence with settings of a writer terminal unit and distributor terminal units; a post distribution path storage unit for storing a distribution path of the post, established by tracking a post ID for the post; an authorization management unit for providing management authority for the post, set from the writer terminal unit, to each of the writer and the distributors; and a blog linkage unit for permitting the blog management unit's control corresponding to the management authority provided by the authorization management unit, and blocking the blog management unit's control not corresponding to the management authority provided by the authorization management unit when the post is controlled through the blog management unit.

In accordance with yet another aspect of the present invention, there is provided a method of distributing a blog post based on personal networking in a blog service providing system, the method including the steps of (a) registering a post with a blog of a writer by a writer terminal unit; (b) selecting at least one or more distributors from among acquaintances registered to personal networking with the writer, and distributing the post to blogs of the selected distributors by the writer terminal unit; (c) selecting at least one or more redistributors from among acquaintances registered to personal networking with the distributors, and distributing the post to blogs of the selected redistributors by distributor terminal units of the distributors, to which the post is distributed; (d) providing management authority for the post to the writer and the distributors by a service management server; and (e) controlling the post according to the provided management authority when the writer or the distributors control the post.

Preferably, the post includes contents posted for notice.

Preferably, step (b) further includes the step of making settings for preventing the post from being distributed in a reverse direction back to the writer's blog after the post is distributed.

Preferably, the method further includes the step of controlling the post not to be distributed any longer when a command for stopping distribution of the post is received through the writer terminal unit.

Preferably, step (c) further includes the step of posting the post on blogs of other acquaintances according to settings of sharers/distributors corresponding to the other acquaintances blogs, or repeatedly distributing the post to blogs of at least one or more yet other acquaintances registered to personal networking with the sharers/distributors corresponding to the other acquaintances' blogs after the post is distributed.

Preferably, the management authority includes at least one of authority to modify the post, authority to delete the post, and authority to set the post to "Public/private"

Preferably, in step (e), when the post is controlled by the writer, the post is changed for all the blogs with which the post is registered, including the writer's blog and the distributors blogs to which the post is distributed.

Preferably, in step (e), when the post is controlled by the distributors, the post is changed only for the blog of the distributor who controls the post, or is changed for at least one or more of the writer's blog and the distributors blogs to which the post is distributed, according to the level of authority already provided to the distributor.

ADVANTAGEOUS EFFECTS

Accordingly, a system and method according to the present invention distributes a blog post containing a writer's specific purpose of posting, such as a help-wanted notice, not unilaterally but step by step through blogs registered with an online community service, based on trust relationships, for example, online acquaintanceships, thereby providing an notice platform, which is so efficient that an advertiser who writes a blog post, such as a help-wanted notice, can quickly find a qualified person, based on his/her trust relationships.

BRIEF DESCRIPTION OF DRAWINGS

The above and other objects, features and advantages of the present invention will become more apparent from the following detailed description taken in conjunction with the accompanying drawings, in which.

MODE FOR THE INVENTION

Hereinafter, preferred embodiments of a system for distributing (transmitting or propagating) a blog post (article) based on personal networking according to the present invention will be described in detail with reference to the accompanying drawings.

Figure 1:
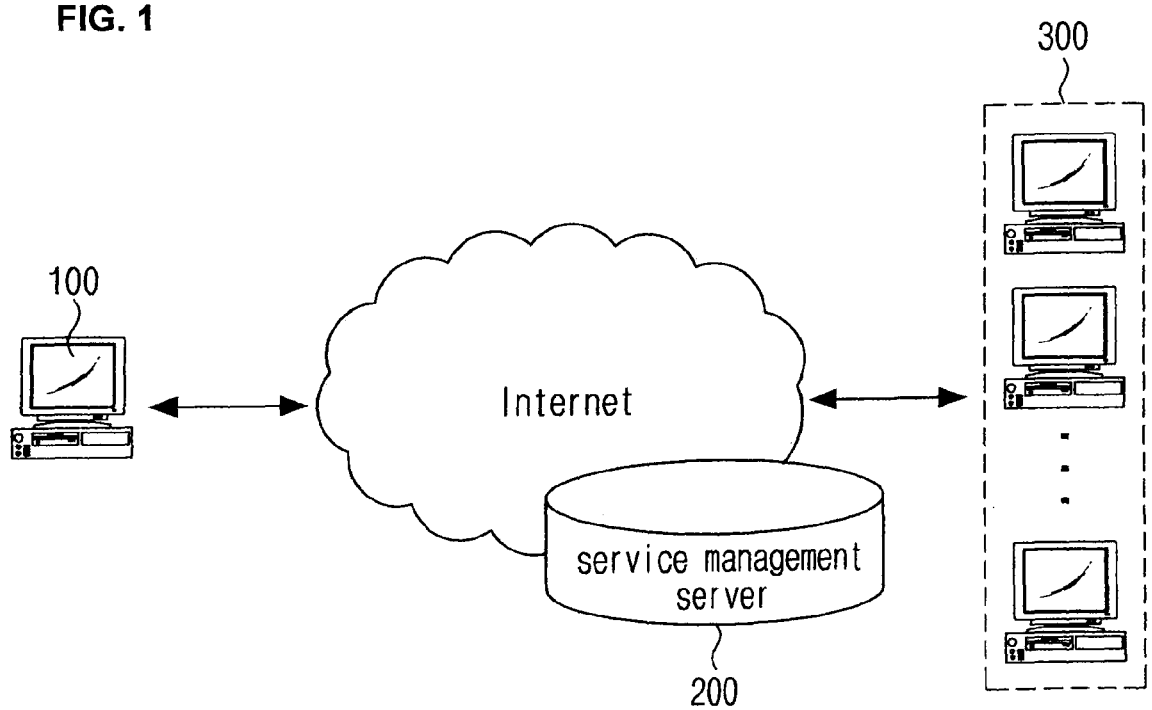
FIG. 1 is a view illustrating an architecture of a system for distributing a blog post based on personal networking in accordance with a preferred embodiment of the present invention.

FIG. 1 illustrates the architecture of a system for distributing a blog post based on personal networking according to a preferred embodiment of the present invention. As illustrated in FIG. 1 only by way of example, the system for distributing a blog post based on personal networking includes a writer terminal unit 100, which makes a series of settings for forming the particular requirements of a writer, that is, a blog post containing contents posted by the writer, through the writer's blog registered with an online community service, specifying at least one or more acquaintances blogs registered online to personal networking with the writer on the service, and then distributing the blog post to the specified acquaintances blogs, sharer/distributor terminal units 300, which correspond to the acquaintances blogs to be provided with the blog post, and make additional setting for posting the blog post on the corresponding acquaintances blogs by setting the blog post to "Public" or distributing the blog post to at least one or more other acquaintances blogs registered to personal networking with sharers/distributors, and a service management server 200, which differentially provides management authority for the blog post, such as authority to modify the blog post, delete the blog post, and set the blog post to "Public" to each of the writer and the sharers/distributors, based on initial settings made by the writer, and integrally manages the blog post distributed to a plurality of blogs including the writer's blog, the acquaintances blogs, and the other acquaintances blogs by tracking and storing a path along which the blog post is distributed (transmitted or propagated).

The service management server 200 sets personal networking between a plurality of blogs including acquaintances blogs based on personal networking with a writer, other acquaintances blogs based on personal networking with sharers/distributors, and yet other acquaintances blogs based on personal networking with other sharers/distributors through at least one of tree-type and cycle-type structures.

The service management server 200 sets an inbound link for a writer's blog as "0" while distributing a blog post formed through settings made by the writer terminal unit 100 to acquaintances blogs based on personal networking with the writer, thereby preventing the blog post written by the writer from being distributed back to the writer's blog, and sets inbound links for a plurality of blogs (including other acquaintances blogs based on the personal networking with sharers/distributors who are provided with the blog post, and yet other acquaintances blogs based on personal networking with at least one or more other sharers/distributors who are provided with the blog post distributed from the sharers/distributors blogs) as "0" so that the blog post is distributed only once to the sharers/distributors blogs other than the writer's blog, thereby preventing duplicate distribution of the blog post.

Also, a blog post may include contents posted by a writer, and various meta information including replies and trackbacks corresponding to the contents.

Thereupon, when a writer, sharers/distributors, or at least one or more other sharers/distributors in the case of additionally distributing a blog post by the sharers/distributors exercise their authority to modify contents posted by a writer, and replies and trackbacks corresponding to the contents, included in the blog post, delete them, set them to "Public" and so forth, the service management server 200 changes the blog post in connection with a plurality of blogs to which the blog post is distributed, based on authority already provided to each of those who exercise their authority.

Herein, a case where a blog post is written for the purpose of a help-wanted notice will be described in detail by way of example. For a blog post that has been already distributed, when its writer exercises at least one of authority to modify at least one of the contents of the blog post and relies/trackbacks for the blog post, authority to delete the same, and authority to set the same to "Public/private" the blog post is preferably changed for all blogs of sharers/distributors who have been provided with the blog post.

Authority to be exercised by a sharer/distributor who has been initially provided with a blog post from a writer's blog is reduced as compared to that of the writer, and thus it is impossible for the sharer/distributor to modify the contents of the blog post. The sharer/distributor may exercise authority to delete the blog post provided from the writer's blog, but the blog post is deleted only from blogs in connection with the sharer/distributor's blog, that is, blogs to which the blog post has been distributed from the sharer/distributor's blog, and is not deleted even from the writer's blog.

Further, a sharer/distributor who has been initially provided with a blog post from a writer's blog may modify and delete replies included in the blog post, and it is preferable to set his/her authority for the replies in such a manner as to be freely exercised because most of the replies are the opinions of sharers/distributors.

Further, authority to be exercised for a blog post by sharers/distributors other than a sharer/distributor who has been initially provided with a blog post from a writer's blog, that is, sharers/distributors who have been subsequently provided with the blog post via an additional distribution path, is further reduced.

The writer terminal unit 100 and the sharer/distributor terminal units 300 are implemented by wired or wireless terminal units, and are capable of WEB or WAP access to the service management server 200.

Figure 2:
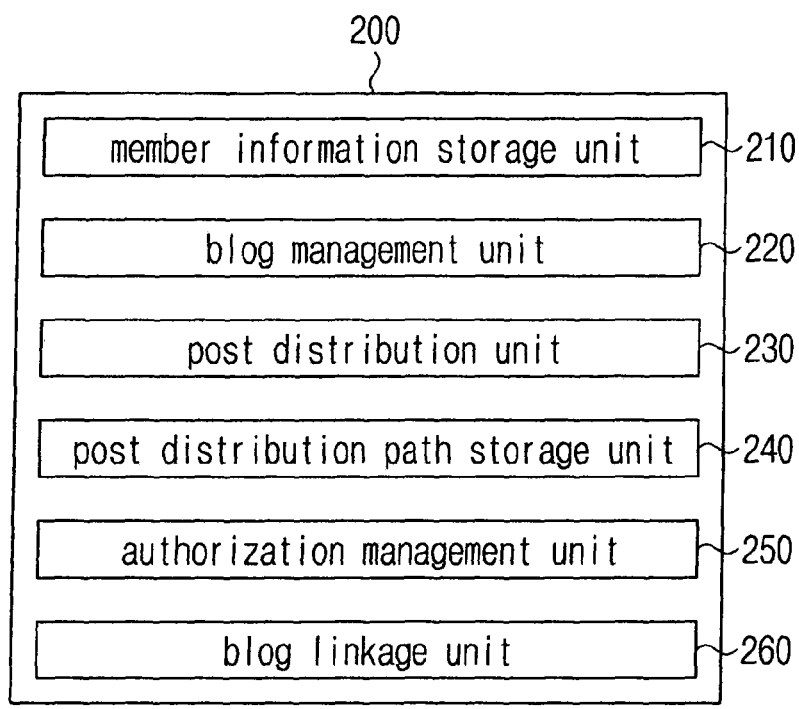
FIG. 2 is a block diagram illustrating a structure of a service management server in FIG. 1.

FIG. 2 illustrates the structure of the service management server 200 in FIG. 1. As illustrated in FIG. 2 only by way of example, the service management server 200 includes a member information storage unit 210 for managing information on respective members who form a blog on an online community service and information on personal networking capable of linking the respective members services, a blog management unit 220 for managing a plurality of blogs including a blog of a writer who forms a blog post, such as a help-wanted notice, acquaintances blogs which are provided with the blog post from the writer's blog, and at least one or more other acquaintances blogs which are further provided with the blog post from the acquaintances blogs via an additional post distribution path, and providing a menu for performing at least one of functions to form, modify, and delete the blog post, a post distribution unit 230 for distributing the blog post between the plurality of blogs through settings of the writer terminal unit 100 and the distributor terminal units 300, a post distribution path storage unit 240 for storing a distribution path of the blog post, established by tracking a post ID for the blog post, an authorization management unit 250 for providing management authority for the blog post, set from the writer terminal unit 100, to each of the writer and sharers/distributors, and a blog linkage unit 260 for changing the blog post for the blog of an entity that exercises the management authority and changing the blog post for at least one or more corresponding blogs among the plurality of blogs including the writer's blog and the acquaintances blogs in correspondence with the level of the management authority already provided to the entity when the management authority for the blog post is exercised through the blog management unit 220.

Figure 3:
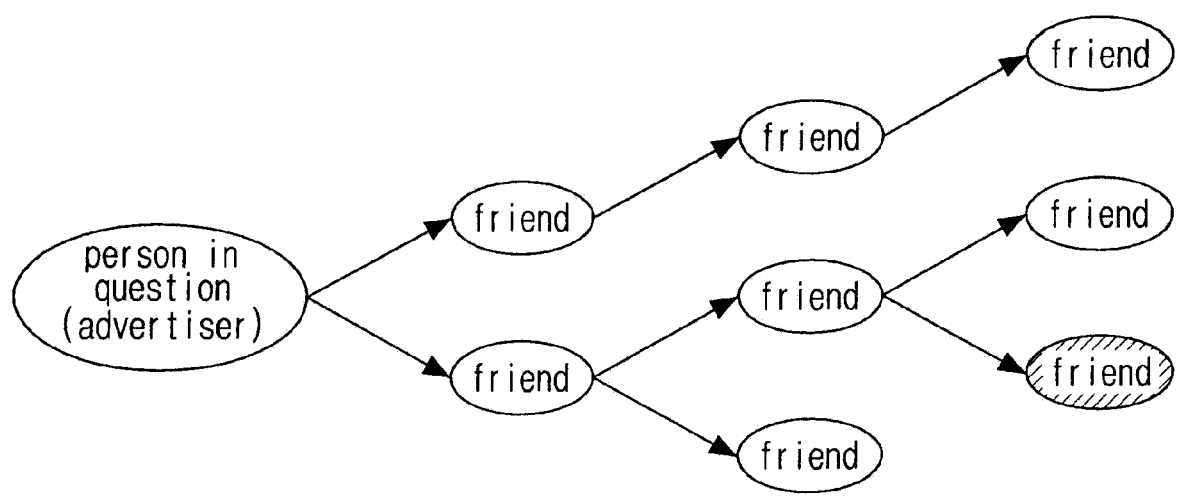
FIG. 3 is a conceptual view illustrating a process of placing an notice for help-wanted through the system for distributing a blog post based on personal networking, illustrated in FIG. 1.

FIG. 3 illustrates a concept of placing a help-wanted notice through the system in FIG. 1. As illustrated in FIG. 3 only by way of example, an advertiser posts a help-wanted notice on a blog post, and the blog post containing the help-wanted notice is distributed form its writer's blog to a plurality of acquaintances blogs, so that the notice can quickly find a qualified person by using his/her trust relationships. Thereupon, the advertiser can instantly confirm reactions or responses to the distributed blog post by using replies and trackbacks posted on the writer's blog, and thus can find and employ a qualified person.

Reference will now be made in detail to how the system for distributing a blog post based on personal networking according to the present invention operates, with reference to FIG. 4.

Figure 4:
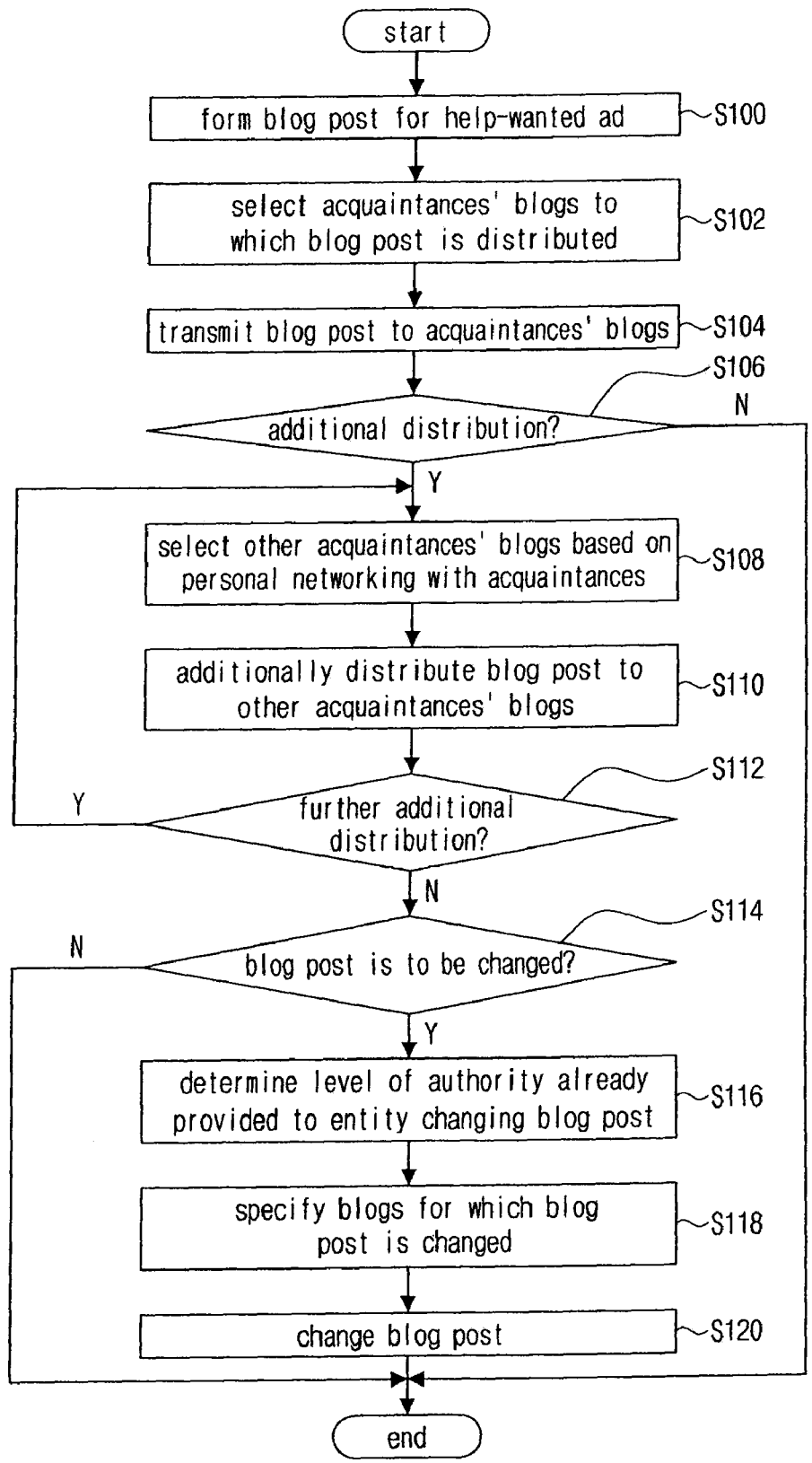
FIG. 4 is a flowchart illustrating an operation of the system for distributing a blog post based on personal networking, illustrated in FIG. 1.

FIG. 4 illustrates the operation of the system in FIG. 1. As illustrated in FIG. 4 only by way of example, a method of distributing a blog post based on personal networking starts with a step of forming and registering a blog post for a help-wanted notice through a writer's blog by the writer (S100).

Subsequently, at least one or more blogs are selected from among acquaintances blogs registered to personal networking with the writer on the writer's blog, and the formed blog post is distributed to the selected acquaintances' blogs (S102 and S104).

Each of sharers/distributors who manage the at least one or more acquaintances blogs that are provided with the blog post selects at least one or more blogs from among other acquaintances blogs registered to personal networking with him/her on his/her blog, and further distributes the blog post provided from the writer's blog to the selected other acquaintances' blogs (S108 and S110).

Further, each of other sharers/distributors who manage the at least one or more acquaintances blog that are provided with the blog post through step S110 may additionally distribute the blog post by using his/her personal networking (S112).

Subsequently, when the distributed blog post is changed, for example, modified, deleted, set to "Public" and the like, by the writer or each of the sharers/distributors (S114), the level of management authority for the blog post, already provided to the entity changing the blog post, is determined (S116), and at least one or more blogs for changing the blog post in connection with the blog post change in the entity's blog are specified based on a result of the determination in step S116 (S118).

Then, the blog post is changed for the at least one or more blogs specified in step S118 (S120).

As described above, if a writer sets distributors after registering a blog post with his/her blog, the corresponding post is distributed to the distributors blogs. Here, the distributors may redistribute the corresponding post to other blogs, or may also share the corresponding post rather than redistribute it.

That is, distribution refers to a function capable of further sharing a shared post with others. If a post is set to "Distributable" when its original copy is written, a user sharing the post with the writer can further share the shared post with his/her bilateral friends.

Reference will now be made in detail to a method of sharing a blog post between users in the system for distributing a blog post based on personal networking according to the present invention.

A post written by a user may be registered with other users blogs in addition to the corresponding user's blog.

called sharing of a post. Users with whom to share a post must be bilateral friends with a user who writes the post. If a user writes a post and selects bilateral friends with whom to share the corresponding post, the corresponding post becomes a shared post. When the selected bilateral friends accept of a request for sharing the corresponding post, the same post exists in the bilateral friends' blogs.

When a user writes a normal post, information on the post is stored in a TB_POSTING table, as presented below in Table 1. Here, the TB_POSTING table is an example of a table for storing information such that the post can be registered with blogs of a plurality of sharers.

TABLE 1

| USER_ID | CONTENT_ID | FROM_ID | ORG_ID | SHARE_FLAG |
|---------|------------|---------|--------|------------|
| A       | 100        | NULL    | 100    | N          |

If user A writes a post and selects bilateral friends B and C with whom to share the post, information on the post is stored in the TB_POSTING table, as presented below in Table 2. The original post written by user A is stored with CNTENT_ID 101, and a record is also stored with a separate CONTENT_ID for each of B and C receiving a post sharing request.

FROM_ID indicates from whom the post is shared and for which post sharing is made. Thus, the FROM_ID is set to NULL in the case of the original post, and is set to the CONTENT_ID of the original post of A in the case of a post shared by B and C.

ORG_ID is set to the CONTENT_ID of the original post. It is the same as the FROM_ID in the case of simple sharing, but is meaningful when the post is distributed. SHARE_FLAG stores the sharing status of a corresponding post. N denotes a normal post, Y denotes a shared post, and S denoted a distributed post.

The SHARE_FLAG of the post written by A is set to Y because it is shared with B and C, and the SHARE_FLAG of the post shared by B and C is set to N.

TABLE 2

| USER_ID | CONTENT_ID | FROM_ID | ORG_ID | SHARE_FLAG |
|---|---|---|---|---|
| A | 101 | NULL | 101 | Y |
| B | 102 | 101 | 101 | N |
| C | 103 | 101 | 101 | N |

Information on whether or not B and C accept of the sharing request is not stored in the TB-POSTING table. Such information is stored in a separate table called TB_POSTING_SHARELIST, as presented below in Table 3.

Table 3 indicates that B and C receive a sharing request for a post having CONTENT_ID 101, and do not accept or rejects the request yet. ALLOW_FLAG is set to N when a sharing request is not yet accepted or rejected, is set to Y when a sharing request is accepted, and is set to X when a sharing request is rejected.

TABLE 3

| USER_ID | CONTENT_ID | ALLOW_FLAG |
|---|---|---|
| B | 101 | N |
| C | 101 | N |

If user A writes a post, selects bilateral friends B and C with whom to share the post, and makes setting for distributing the post, information on the post is stored in the TB_POSTING table, as presented below in Table 4. Since the post written by A is a shared post set to "Distributable" the SHARE_FLAG is set to S.

TABLE 4

| USER_ID | CONTENT_ID | FROM_ID | ORG_ID | SHARE_FLAG |
|---|---|---|---|---|
| A | 201 | NULL | 201 | S |
| B | 202 | 201 | 201 | N |
| C | 203 | 201 | 201 | N |

Also, the following information is stored in the TB_POSTING_SHARELIST table, as presented below in Table 5.

TABLE 5

| USER_ID | CONTENT_ID | ALLOW_FLAG |
|---|---|---|
| B | 101 | N |
| C | 101 | N |

In order to distribute a shared post, a sharing request must be accepted first before the post is distributed. Thus, if B accepts of the sharing request, the TB_POSTING_SHARELIST is changed as follows:

TABLE 6

| USER_ID | CONTENT_ID | ALLOW_FLAG |
|---|---|---|
| B | 101 | Y |
| C | 101 | N |

Since A has made settings for distributing the post when writing it, B can share the shared post with his/her bilateral friends. When B shares the post with his/her bilateral friend D, that is, distributes the post to his/her bilateral friend D, information as presented below in Table 9 is stored in the TB_POSTING table, and information as presented below in Table 8 is stored in the TB_POSTING_SHARELIST table.

TABLE 7

| USER_ID | CONTENT_ID | FROM_ID | ORG_ID | SHARE_FLAG |
|---|---|---|---|---|
| A | 201 | NULL | 201 | S |
| B | 202 | 201 | 201 | N |
| C | 203 | 201 | 201 | N |
| D | 204 | 202 | 201 | N |

TABLE 8

| USER_ID | CONTENT_ID | ALLOW_FLAG |
|---|---|---|
| B | 101 | Y |
| C | 101 | N |
| D | 102 | N |

Reference will now be made in detail to a method of deleting a shared post.

If a normal post is deleted, the record of the corresponding post is deleted from the TB_POSTING table. However, a shared post is deleted in a different manner than a normal post, and additionally is differently handled for two cases, that is, a case where a post to be deleted is the original post and a case where a post to be deleted is a post shared from another post.

First, when the original post is deleted, deleting the original post is the same as deleting a normal post, but the records of all posts shared or distributed from the original post must be deleted from the TB_POSTING table and the TB_POSTING_SHARELIST table before the record of the original post is deleted.

When a post shared from another post is deleted, the record of the post is not deleted because the distribution linkage chain of the post may be disconnected if the record itself is deleted when the person who has received the corresponding shared post delete the post. Instead of this, the value of the POSTING_STATUS column of the TB_POSTING table is changed to 1. Therefore, when posts are inquired of the TB_POSTING table, only posts having a value of 0 in the POSTING_STATUS column must be inquired, and posts having a value of 1 in the POSTING_STATUS column must be treated as those ones that have been deleted. That is, the latter posts exist in a database for data integrity, but are treated so as not to be inquired.

Although preferred embodiments of the present invention have been described in detail for illustrative purposes, those skilled in the art will appreciate that various modifications, additions and substitutions are possible, without departing from the scope and spirit of the invention as disclosed in the accompanying claims.

INDUSTRIAL APPLICABILITY

The system and method according to the present invention distributes a blog post containing a writer's specific purpose of posting, such as a help-wanted notice, not unilaterally but step by step through blogs registered with an online community service, based on trust relationships, for example, online acquaintanceships, thereby providing a notice platform, which is so efficient that an advertiser who writes a blog post, such as a help-wanted notice, can quickly find a qualified person, based on his/her trust relationships. Therefore, the present invention has sufficient marketability and commercial feasibility, as well as actual practicability, and thus is applicable to the industry.

The invention claimed is:

1. A system for distributing a blog post based on personal networking, the system comprising:
a writer's terminal for registering a post with the writer's blog containing content posted by the writer and for distributing the writer's blog to acquaintance blogs;
a plurality of distributor terminal units representing acquaintance blogs to whom the writer's blog post is initially distributed and to other acquaintance blogs distributed through the distributor terminals;
a service management server for managing a blog service under the control of said,
wherein the service management server provides management authority for the post to the writer and to other acquaintances as the distributors and
wherein the service management server sets an inbound link for the writer's blog as a first variable value, sets inbound links for the distributors blogs, to which the post is distributed, as second variable values other than zero when the post is distributed, and distributes the post only if inbound links for distributors blogs, to which the post is to be distributed, do not have the first variable value or the second variable values when the post is distributed, so that the blog post is distributed only once through the plurality of distributer units other than the writer's blog thereby preventing duplicate distribution of the blog post.

2. The system as claimed in claim 1, wherein the writer terminal unit registers the post with the writer's blog, selects at least one or more distributors from among acquaintances registered to personal networking with the writer, and then distributes the post to blogs of the selected distributors, and wherein the distributor terminal units select at least one or more redistributors from among acquaintances registered to personal networking with the selected distributors, and then distribute the post to blogs of the selected redistributors.

3. The system as claimed in claim 1, wherein the service management server controls the post not to be distributed any longer when a command for stopping distribution of the post is received through the writer terminal unit.

4. The system as claimed in claim 1, wherein the post includes contents posted by the writer, and replies and trackbacks corresponding to the contents.

5. The system as claimed in claim 4, wherein the management authority includes at least one of authority to modify the post, authority to delete the post, and authority to set the post to "Public/private".

6. The system as claimed in claim 1, wherein, when either the writer terminal unit or the distributor terminal units control the post, the service management server permits the writer terminal unit's or the distributor terminal units control corresponding to the provided management authority, and blocks the writer terminal unit's or the distributor terminal units control not corresponding to the provided management authority.

7. The system as claimed in claim 1, wherein the service management server employs the same post ID for the post in all the blogs to which the post is distributed.

8. The system as claimed in claim 1, wherein, when any terminal unit is to share the post, the service management server permits sharing of the post when the terminal unit is the writer terminal unit or one of the distributor terminal units, and blocks sharing of the post when the terminal unit is a sharer's terminal unit.

9. The system as claimed in claim 8, wherein the service management server includes a shared post management table containing an ID of the post, an ID of a user who allows sharing of the post, and an ID of the original post.

10. The system as claimed in claim 8, wherein the service management server comprises: a blog management unit for managing a plurality of blogs including the writer's and the distributors blogs, and providing a menu for performing at least one of functions to form, modify, and delete the post in the blogs; an authorization management unit for providing management authority for the post, set from the writer terminal unit, to each of the writer and the distributors; and a blog linkage unit for permitting the blog management unit's control corresponding to the management authority provided by the authorization management unit, and blocking the blog management unit's control not corresponding to the management authority provided by the authorization management unit when the post is controlled through the blog management unit.

11. A method of distributing a blog post based on personal networking by a service management server in a blog service providing system including a writer's terminal and a plurality of distributor units representing acquaintance blogs in addition to the service management server, the method comprising the steps of:
(a) generating the writer's blog from the writer terminal unit, and registering a blog post with the writer's blog and specifying at least one or more acquaintance blogs registered online for personal networking with the writer and distributing the blog post to the plurality of distributer units which correspond to all acquaintance blogs provided with the blog post;

(b) using the service management server to select from among acquaintances registered for personal networking with the writer, from the writer terminal unit, and from acquaintances registered for personal networking from the plurality of distributor terminal units to which the post is distributed and to redistribute the post to blogs of all the selected acquaintances;

(c) using the service management server for making settings for preventing the post from being distributed in a reverse direction back to the writer's blog after the post is distributed;

(d) using the service management server for setting an inbound link for the writer's blog as a first variable value, setting inbound links for the distributors blogs, to which the post is distributed, as second variable values other than zero when the post is distributed, and distributing the post only if inbound links for distributors blogs, to which the post is to be distributed, do not have the first variable value or the second variable values when the post is distributed, so that the blog post is distributed only once through the plurality of distributer units other than the writer's blog thereby preventing duplicate distribution of the blog post;

(e) providing management authority for the post to the writer and the distributors; and (f) if a command for controlling the post is received from the writer or the distributors, controlling the post according to the provided management authority.

12. The method as claimed in claim 11, wherein the post includes contents posted for notice.

13. The method as claimed in claim 11, further comprising the step of controlling the post not to be distributed any longer when a command for stopping distribution of the post is received through the writer terminal unit.

14. The method as claimed in claim 11, wherein step (c) further comprises the step of posting the post on blogs of other acquaintances according to settings of sharers/distributors corresponding to the other acquaintances blogs, or repeatedly distributing the post to blogs of at least one or more yet other acquaintances registered to personal networking with the sharers/distributors corresponding to the other acquaintances blogs after the post is distributed.

15. The method as claimed in claim 11, wherein the management authority includes at least one of authority to modify the post, authority to delete the post, and authority to set the post to "Public/private".

16. The method as claimed in claim 11, wherein, in step (f), the post is changed for all the blogs with which the post is registered, including the writer's blog and the distributors blogs to which the post is distributed, when the command for controlling the post is received from the writer.

17. The method as claimed in claim 11, wherein, in step (f), the post is changed only for the blog of the distributor who is to control the post, or is changed for at least one or more of the writer's blog and the distributors blogs to which the post is distributed, according to a level of the authority already provided to the distributor, when the command for controlling the post is received from the distributor.

18. The method as claimed in claim 11, further comprising the steps of: receiving information on at least one or more sharers, selected from among the acquaintances registered to personal networking with the distributors, from the distributor terminal units of the distributors to which the post is distributed; and sharing the post to blogs of the selected sharers.

19. The method as claimed in claim 18, wherein the step of sharing the post further comprises the step of receiving a command to accept or reject a request for sharing the post from sharer terminal units of the sharers, and the post is shared to the sharers blogs only when the sharers accept of the request.

20. The method as claimed in claim 18, further comprising the steps of: when a command to delete the shared post is received from the sharers terminal units, determining if the post is an original post or a post shared from another post; when the post is the original post, deleting all posts shared or distributed from the post, and then deleting the original post; and when the post is the post shared from another post, setting a column, which indicates whether or not the corresponding post is displayed, to a value indicating that the corresponding post does not have to be displayed.

21. The method as claimed in claim 20, wherein, when the post is displayed in the blogs, the corresponding post is not displayed if the column indicating whether or not the post is displayed is set to the value indicating that the corresponding post does not have to be displayed.

* * * * *